United States Patent
Itoh et al.

(10) Patent No.: US 6,248,687 B1
(45) Date of Patent: Jun. 19, 2001

(54) PROCESS FOR PRESULFURIZING A DESULFURIZATION CATALYST USED IN A HYDRODESULFURIZATION UNIT OF PETROLEUM REFINERY AND PRESULFURIZATION PROMOTER

(75) Inventors: Hirokazu Itoh, Hyogo; Kazuaki Abe; Yoshihiro Arita, both of Osaka; Einosuke Jodo, Kyoto; Kazuya Hata; Tetsushi Kawamura, both of Tokyo, all of (JP)

(73) Assignees: Nippon Shokubai Co., LTD (JP); Elf Atochem S.A. (FR)

( * ) Notice: Subject to any disclaimer, the term of this patent is extended or adjusted under 35 U.S.C. 154(b) by 0 days.

(21) Appl. No.: 09/343,388

(22) Filed: Jun. 30, 1999

(30) Foreign Application Priority Data

Jul. 2, 1998 (JP) .................................................. 10-187547
Jul. 23, 1998 (JP) .................................................. 10-207855

(51) Int. Cl.$^7$ ............................. B01J 27/02; B01J 23/00; B01J 27/047; C07C 319/00
(52) U.S. Cl. .......................... 502/216; 502/168; 502/219; 502/220; 502/221; 502/313; 502/321; 568/38; 568/39; 568/45; 568/50; 568/57; 568/61; 568/62; 568/66; 568/69
(58) Field of Search .................................... 502/216, 219, 502/220, 221, 313, 321, 168; 568/57, 38, 39, 45, 50, 61, 62, 66, 69

(56) References Cited

U.S. PATENT DOCUMENTS

| | | | |
|---|---|---|---|
| 4,213,850 | * | 7/1980 | Riddick, Jr. et al. ............ 208/216 R |
| 4,520,129 | * | 5/1985 | Murtha ................................. 502/222 |
| 5,169,819 | * | 12/1992 | Berrebi ................................. 502/168 |

FOREIGN PATENT DOCUMENTS

| | | | |
|---|---|---|---|
| 0 506 206 A1 | 4/1988 | (EP) | ........................................ 37/20 |
| 0 300 629 A1 | 7/1988 | (EP) | ............................................ 49/6 |
| 0 329 499 A1 | 1/1989 | (EP) | ........................................ 37/20 |

OTHER PUBLICATIONS

Eueopean Search Report dated Oct. 20, 1999.

* cited by examiner

Primary Examiner—Mark L. Bell
Assistant Examiner—Patricia L. Hailey
(74) Attorney, Agent, or Firm—Smith Gambrell & Russell LLP

(57) ABSTRACT

Presulfurizing process and presulfurization promoter for a desulfurization catalyst to be used in a hydrodesulfurization unit of petroleum refinery of high molecular hydrocarbons, in which fresh metal oxide in said desulfurization catalyst is sulfurized with hydrogen sulfide produced from sulfur-containing compounds in a feed stream. In the invention, a compound having mercapto alkylthio group: HS—$C_mH_{2m}$—S— (in which "m" is an integer of 2 to 4) is added as promoter at a proportion of 10 ppm to 0.5% by weight and presulfurization is promoted at 180 to 260° C.

6 Claims, 1 Drawing Sheet

PROCESS FOR PRESULFURIZING A DESULFURIZATION CATALYST USED IN A HYDRODESULFURIZATION UNIT OF PETROLEUM REFINERY AND PRESULFURIZATION PROMOTER

BACKGROUND OF THE INVENTION

1. Field of the Invention

This invention relates to a process for presulfurizing a desulfurization catalyst used in a hydrodesulfurization unit of petroleum refinery of high molecular hydrocarbons, and to presulfurization promoter used in the process.

In particular, this invention relates to a novel presulfurization promoter used in hydrodesulfurization of metal oxide in desulfurization catalyst, which is necessary at the start of operation when a desulfurization catalyst is charged freshly in a fixed bed.

2. Description of Related Art

In petroleum refinery of high molecular hydrocarbons, hydrodesulfurization is widely used. The usual hydrodesulfurization is effected with a catalyst of oxide or sulfide of metal such as cobalt, nickel, molybedenum or tungsten supported on carriers of alumina or the like. Since hydrodesulfurization and hydrodesulfurization catalyst are well-known and reported in many documents and are not a subject of the present invention, they will be not described here in details. Their short explanation is described in "Chemical Dictionary 5" pages 64 to 65, published by Kyouritsu-Shupan, Oct. 15, 1981.

In the hydrodesulfurization, at the start of operation or when a hydrodesulfurization catalyst is freshly charged or packed in a fixed bed, the hydrodesulfurization catalyst must be subjected to "presulfurization" or preliminary sulfurization treatment before new petroleum refinery cycle starts. The conventional presulfurization technique is classified into so-called "feed sulfurization method" and "chemical spiking method".

In the "feed sulfurization method", sulfur-containing organic compounds contained in a feed stream are hydrocracked at relatively higher temperature (about 260 to about 320° C.) to produce hydrogen sulfide which is then contacted with metal oxide supported on freshly charged catalyst to produce metal sulfides.

In the "chemical spiking method", artificially prepared sulfur-containing organic compound which is rich in sulfur content is added to a feed stream and is then hydrocracked at relatively lower temperature (about 180 to about 260° C.) to produce hydrogen sulfide with which freshly charged catalyst is sulfurized preliminary.

In the "feed sulfurization method", sulfur-containing organic compounds contained in a feed stream are hydrocracked at relatively higher temperature as about 280° C. and react with hydrogen stream to produce hydrogen sulfide, so that undesired unsaturated hydrocarbons are produced. Reaction temperature, however, can not be elevated rapidly, because rapid elevation of temperature results in generation of unsaturated hydrocarbons, which will be a cause of undesirable deposition of cokes. Therefore, reaction temperature must be elevated gradually so that efficiency of the preliminary sulfurization is sacrificed. In fact, this method requires longer time.

In the "chemical spiking method", the reaction time can be reduced remarkably. However, the "chemical spiking method" requires a larger amount of expensive sulfur-containing organic compound and hence is not economical.

Inventors found such a fact that an amount of hydrogen sulfide can be increased remarkably when a compound having mercapto alkylthio group co-exist together with sulfur-containing compounds contained in a feed stream which is a source of hydrogen sulfide for presulfurizing a new catalyst used in hydrodesulfurization.

In the present invention, a compound having mercapto alkylthio group is incorporated in a feed stream in a temperature range where unsaturated hydrocarbons causing trouble of undesired cokes are difficulty produced (about 180 to about 260° C.) to promote hydrocracking of sulfur compounds in the feed stream, so that a larger amount of hydrogen sulfide produced is contacted with metal oxide in the catalyst.

SUMMARY OF THE INVENTION

The present invention provides a presulfurization process for a desulfurization catalyst to be used in a hydrosulfurization unit of petroleum refinery of high molecular hydrocarbons, in which fresh metal oxide in the desulfurization catalyst is sulfurized with hydrogen sulfide produced from sulfur-containing compounds in a feed stream, characterized in that the presulfurization is effected at lower temperature in the presence of at least one compound having at least one mercapto alkylthio group, which is added 10 ppm to 0.5% by weight with respect to the total amount of the feed stream.

Another subject of the present invention is a presulfurization promoter for a desulfurization catalyst to be used in hydrodesulfurization in petroleum refinery of high molecular hydrocarbons, comprising a compound having mercapto alkylthio group.

The presulfurization process according to the present invention can be carried out at relatively lower temperatures and there is no special limitation in temperatures. However, a preferable temperature range to prevent generation of unsaturated hydrocarbons causing undesired cokes is 180 to 260° C.

The compound having at least one mercapto alkylthio group used in the present invention is any compound having one or more than one mercapto alkylthio group in which mercapto group and sulfur atom are spaced by an alkylene group having carbon number of 2 to 4, namely any compound having a mercapto alkylthio group represented by the general formula:

HS—$C_mH_{2m}$—S—

(in which "m" is an integer of 2 to 4).

Among these compounds, the present invention is advantageously applicable to those having the mercaprtoalkylthio group whose "m" is 2 or 3.

Examples of such compound are those represented by the general formula:

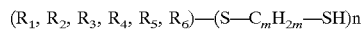
$(R_1, R_2, R_3, R_4, R_5, R_6)$—(S—$C_mH_{2m}$—SH)n in which each of $R_1$, $R_2$, $R_3$, $R_4$, $R_5$ and $R_6$ is organic group and may be bonded each other through one or more than one chemical bonds, and at least one of $R_1$, $R_2$, $R_3$, $R_4$, $R_5$ and $R_6$ must exist in the compound, the total carbon number of $R_1$, $R_2$, $R_3$, $R_4$, $R_5$ and $R_6$ being 2 to 28, "m" is an integer of 2 to 4, and "n" is an integer of 1 to 6.

Following are examples of the compound:

$HSCH_2CH_2SCH_2CH_2SH$,

$HSCH_2CH_2SCH_2CH_2SCH_2CH_2SH$,

$HOCH_2CH_2SCH_2CH_2SH$ $HO(CH_2CH_2S)_xH$ ("x" is an integer equal to 3 or higher than 3)
$HO(CH_2CH(CH_3)S)_xH$ ("x" is an integer equal to 2 or higher than 2)
$CH_3SCH_2CH_2SH$
$CH_3SCH_2CH_2SCH_2CH_2SH$
$CH_3CH_2CH_2CH_2SCH_2CH_2SH$
$CH_3SCH_2CH(CH_3)SH$
$CH_3CH_2CH_2CH_2SCH_2CH(CH_3)SH$
$C_6H_5SCH_2CH_2SH$
$C_6H_5SCH_2CH(CH_3)SH$
$CH_3OCOCH_2SCH_2CH_2SH$
$CH_3OCOCH_2SCH_2CH_2SCH_2CH_2SH$
$CH_3OCOCH_2SCH_2CH(CH_3)SH$
$CH_3OCOCH_2SCH_2C(CH_3)_2SH$
$C_8H_{17}OCOCH_2SCH_2CH_2SH$
$CH_3OCOCH_2CH_2SCH_2CH_2SH$
$CH_3OCOCH_2CH_2SCH_2CH_2SCH_2CH_2SH$
$CH_3OCOCH_2CH_2SCH_2CH(CH_3)SH$
$CH_3OCOCH_2CH_2SCH_2CH_2SH$
$(HSCH_2COOCH_2)_3 C(CH_2OCOCH_2SCH_2CH_2SH)$
$(HSCH_2COOCH_2)_2 C(CH_2OCOCH_2SCH_2CH_2SH)_2$
$(HSCH_2COOCH_2) C(CH_2OCOCH_2SCH_2CH_2SH)_3$
$C(CH_2OCOCH_2SCH_2CH_2SH)_4$
$(HSCH_2CH_2COOCH_2)_3$
  $C(CH_2OCOCH_2CH_2SCH_2CH_2SH)$
$(HSCH_2CH_2COOCH_2)_2$
  $C(CH_2OCOCH_2CH_2SCH_2CH_2SH)_2$
$(HSCH_2CH_2COOCH_2)C$
  $(CH_2OCOCH_2CH_2SCH_2CH_2SH)_3$
$C(CH_2OCOCH_2CH_2SCH_2CH_2SH)_4$
$(HOCH_2)_3C(CH_2OCOCH_2CH_2SCH_2CH_2SH)$
$(HOCH_2)_2C(CH_2OCOCH_2CH_2SCH_2CH_2SH)_2$
$(HOCH_2)C(CH_2OCOCH_2CH_2SCH_2CH_2SH)_3$
$(HSCH_2CH_2COOCH_2)_2$  $C(C_2H_5)$
  $(CH_2OCOCH_2CH_2SCH_2CH_2SH)$
$(HSCH_2CH_2COOCH_2)$  $C(C_2H_2)$
  $(CH_2OCOCH_2CH_2SCH_2CH_2SH)_2$
$C_2H_5C(CH_2OCOCH_2CH_2SCH_2CH_2SH)_3$
$(HOCH_2)_3CCH_2O—CH_2C(CH_2OH)_2$
  $(CH_2OCOCH_2CH_2SCH_2CH_2SH)$
$(HSCH_2CH_2SCH_2CH_2COOCH_2)(CH_2OH)_2CCH_2—O—$
  $CH_2C(CH_2OH)_2 (CH_2OCOCH_2CH_2SCH_2CH_2SH)$
$HSCH_2CH_2SCH_2CH_2COOCH_2)(CH_2OH)_2CCH_2—O—$
  $CH_2C(CH_2OH)(CH_2OCOCH_2CH_2SCH_2CH_2SH)_2$
$(HSCH_2CH_2SCH_2CH_2COOCH_2)_2(HOCH_2)CCH_2—O—$
  $CH_2C(CH_2OH)(CH_2OCOCH_2CH_2SCH_2CH_2SH)_2$
$(HSCH_2CH_2SCH_2CH_2COOCH_2)_2(CH_2OH)CCH_2—O—$
  $CH_2C(CH_2OCOCH_2CH_2SCH_2CH_2SH)_3$
$(HSCH_2CH_2SCH_2CH_2COOCH_2)_3CCH_2—O—CH_2C$
  $(CH_2OCOCH_2CH_2SCH_2CH_2SH)_3$ In the present invention, a mixture of more than one compound having mercapto alkylthio group can be used.

The presulfurization promoter is added at a proportion of 10 ppm to 0.5% by weight, preferably 50 ppm to 0.5% by weight, more preferably 100 ppm to 0.1% by weight with respect to the total amount of the feed to promote generation of hydrogen sulfide. Advantages of the present invention can not be expected at a proportion of lower than 10 ppm while no advantage and economical merit are obtained about 0.5% by weight.

Temperature range in which the presulfurization promoter is used is between 180° C. and 260° C., preferably between 200° C. and 245° C. When the temperature is not higher than 180° C., it takes too long time in sulfurization, while a temperature higher than 260° C. is not desirable due to formation of unsaturated hydrocarbons which cause undesirable cokes.

DESCRIPTION OF THE PREFERRED EMBODIMENTS

Figure 1:
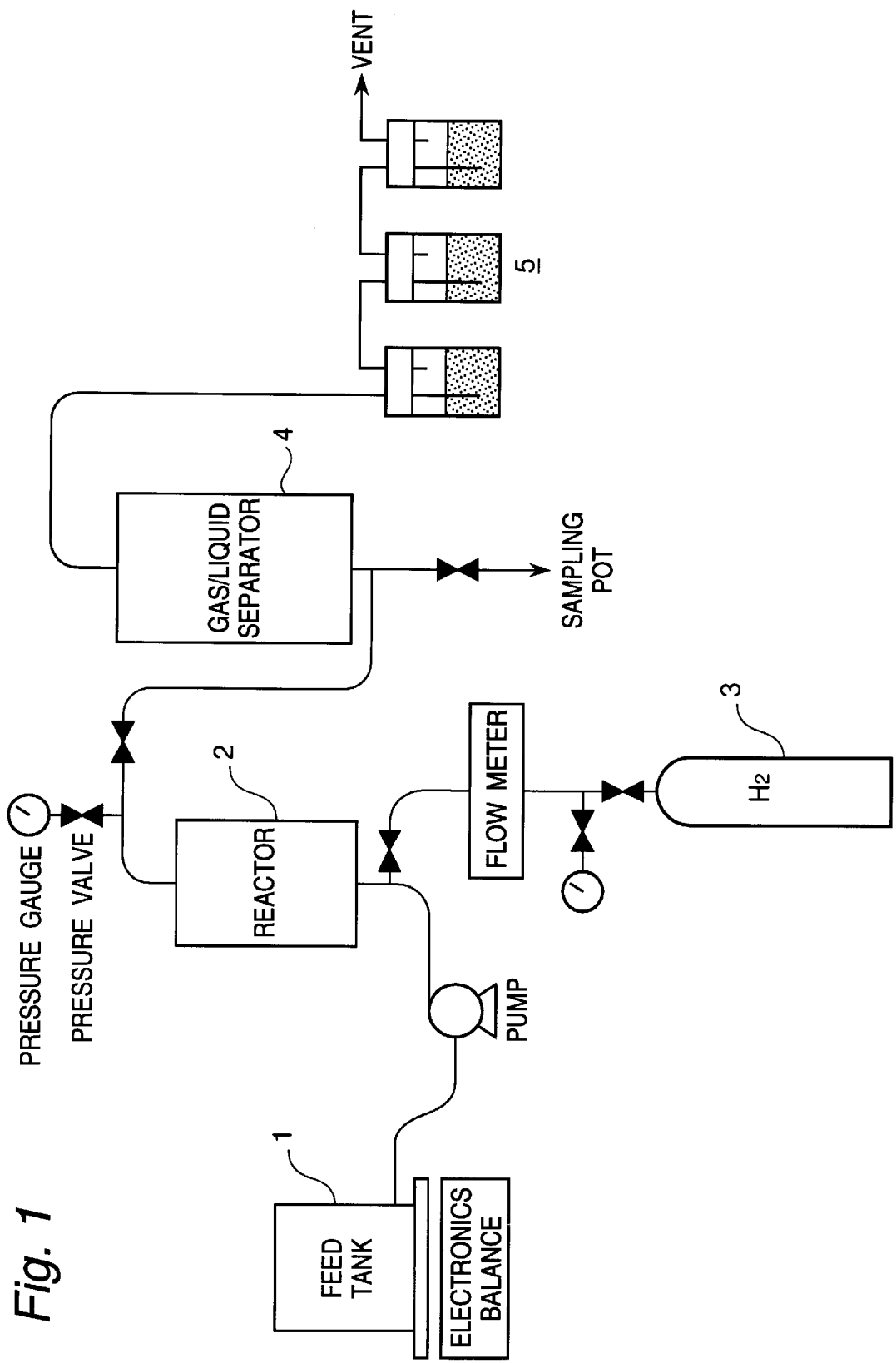
FIG. 1 is an illustrative view of presulfurization unit used in Examples.

Now, examples of the present invention will be described but the present invention is not limited to following illustrative examples.

An experimental presulfurization unit shown in FIG. 1 was used to evaluate how the preliminary sulfurization promoter according to the present invention promote generation of hydrogen sulfide for gas oil containing sulfur at a concentration of 1.6% by weight obtained directly from distillation column.

The presulfurization promoter according to the present invention was added to the gas oil in a feed tank 1. Then, the gas oil was fed continuously to a reactor 2. Hydrogen gas is fed into the gas oil to be fed into the reactor 2 from a hydrogen gas bomb. In the reactor 2, 30 g of commercially available desulfurization catalyst (cobalt-molybdenum catalyst) was charged.

After fresh desulfurization catalyst was charged in the reactor 2, the reactor 2 was heated at 230° C. and the gas oil was fed at a rate of LHSV=1.5 $hr^{-1}$. Hydrogen gas was fed at a rate of 25 nL per 1 L of the gas oil.

A reaction product was passed through a gas/liquid separator 4 and gas phase separated was passed through aqueous solution of sodium hydroxide to absorb hydrogen sulfide. After 6 hours from the start of operation, the aqueous solution of sodium hydroxide was neutralization-titrated to determine hydrogen sulfide absorbed.

For comparison, the same procedure was repeated but the presulfurization promoter according to the present invention was not added.

EXAMPLE 1

$CH_3OCOCH_2SCH_2CH_2SH$ (products of Nippon Shokubai Co., Ltd.) was added as presulfurization promoter at a proportion of 1,000 ppm to the gas oil obtained directly from distillation column.

When the presulfurization promoter according to the present invention was not added, an amount of hydrogen sulfide produced was only 128 mg after 6 hours operation, while the presulfurization promoter according to the present invention was added, the amount of hydrogen sulfide produced was increased to 288 mg under the same condition. Relative increment is 125% (=100×(288−128)/128).

EXAMPLE 2

A mixture of
$CH_3OCOCH_2 CH_2SCH_2CH_2SH$ and
$CH_3OCOCH_2 CH_2SCH_2CH_2SCH_2CH_2SH$
(products of Nippon Shokubai Co., Ltd.) (weight ratio= 90:10) was used as additive and was added at a proportion of 1,000 ppm to the gas oil.

Under the same condition as Example 1, 235 mg of hydrogen sulfide was produced after 6 hours operation (relative increment of 154%).

COMPARATIVE EXAMPLE 1

The same procedure as Example 1 was repeated but pentaerythritol tetrakis-mercapto propionate (product of Elf Atochem S.A.) was added at a proportion of 1,000 ppm to the gas oil.

Under the same condition as Example 1, 207 mg of hydrogen sulfide was produced after 6 hours operation (relative increment of 62%).

COMPARATIVE EXAMPLE 2

The same procedure as Example 1 was repeated but methyl-3-mercapto propionate (product of Elf Atochem S.A.) was added at a proportion of 1,000 ppm to the gas oil.

Under the same condition as Example 1, 170 mg of hydrogen sulfide was produced after 6 hours operation (relative increment of 33%).

COMPARATIVE EXAMPLE 3

The same procedure as Example 1 was repeated but dimethyl disulfide (product of Elf Atochem S.A.) was added at a proportion of 1,000 ppm to the gas oil.

Under the same condition as Example 1, 185 mg of hydrogen sulfide was produced after 6 hours operation (relative increment of 45%).

COMPARATIVE EXAMPLE 4

The same procedure as Example 1 was repeated but dimethyl sulfide (product of Elf Atochem S.A.) was added at a proportion of 1,000 ppm to the gas oil.

Under the same condition as Example 1, 157 mg of hydrogen sulfide was produced after 6 hours operation (relative increment of 23%).

COMPARATIVE EXAMPLE 5

The same procedure as Example 1 was repeated but 2-mercapto ethanol (product of Elf Atochem S.A.) was added at a proportion of 1,000 ppm to the gas oil.

Under the same condition as Example 1, 123 mg of hydrogen sulfide was produced after 6 hours operation. No substantial difference was observed after 6 hours operation.

TABLE 1

| Additive | | HS produced (mg) | relative (mg) |
| --- | --- | --- | --- |
| control | none | 128 | 100 |
| Example 1 | A* | 288 | 225 |
| Example 2 | B** | 325 | 254 |
| Comparative 1 | $C(CH_2OCOCH_2CH_2SH)_4$ | 207 | 162 |
| Comparative 2 | $CH_3OCOCH_2CH_2SH$ | 170 | 133 |
| Comparative 3 | $CH_3SSCH_3$ | 185 | 145 |
| Comparative 4 | $CH_3SCH_3$ | 157 | 123 |
| Comparative 5 | $HOCH_2CH_2SH$ | 123 | 96 |

A*: $CH_3OCOCH_2SCH_2CH_2SH$
B**: a mixture of $CH_3OCOCH_2CH_2SCH_2CH_2SH$ and $CH_3OCOCH_2CH_2SCH_2CH_2SCH_2CH_2SH$ (90:10)

The results reveal that an amount of hydrogen sulfide in presulfurization process can be increased remarkably when a small amount of presulfurization promoter having mercaptothio group according to the present invention is incorporated.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Process comprising presulfurizing a desulfurization catalyst to be used in a hydrodesulfurization unit of petroleum refinery of high molecular weight hydrocarbons, in which fresh metal oxide in said desulfurization catalyst is sulfurized with hydrogen sulfide produced from sulfur-containing compounds in a feed stream, said presulfurization is effected between about 180° C. to about 260° C. by adding at least one compound having at least one mercapto alkylthio group, which is added 10 ppm to 0.5% by weight with respect to the total amount of said feed stream, said compound having at least one mercapto alkylthio group represented by the formula:

$$(R_1, R_2, R_3, R_4, R_5, R_6)-(S-C_mH_{2m}-SH)_n$$

in which each of $R_1$, $R_2$, $R_3$, $R_4$, $R_5$, and $R_6$ is an organic group and is bonded to each other through at least one chemical bond, and at least $R_1$, $R_2$, $R_3$, $R_4$, $R_5$, and $R_6$ must exist in the compound, the total carbon number of $R_1$, $R_2$, $R_3$, $R_4$, $R_5$, and $R_6$ being 2 to 28, "m" is an integer of 2 to 4, and "n" is an integer of 1 to 6.

2. The process according to claim 1, wherein the temperature range is between 200° C. and 245° C.

3. Presulfurization promoter for a desulfurization catalyst to be used in a hydrodesulfurization unit of petroleum refinery of high molecular weight hydrocarbons, in which fresh metal oxide in said desulfurization catalyst is sulfurized with hydrogen sulfide produced from sulfur-containing compounds in a feed stream, said promoter comprising an organic compound having at least one mercapto alkylthio group represented by the formula:

$$HS-C_mH_{2m}-S-$$

in which "m" is an integer of 2 to 4.

4. The presulfurization promoter set forth in claim 3 wherein said compound having at least one mercapto alkylthio group is represented by the formula:

$$(R_1, R_2, R_3, R_4, R_5, R_6)-(S-C_mH_{2m}-SH)_n$$

in which each of $R_1$, $R_2$, $R_3$, $R_4$, $R_5$, and $R_6$ is organic group and is bonded to each other through at least one chemical bond and at least one of $R_1$, $R_2$, $R_3$, $R_4$, $R_5$, and $R_6$ must exist in the compound, the total carbon number of $R_1$, $R_2$, $R_3$, $R_4$, $R_5$, and $R_6$ being 2 to 28, "m" is an integer of 2 to 4, and "n" is an integer of 1 to 6.

5. Method for presulfurization of a promoter comprising treating an organic compound having at least one mercapto alkylthio group represented by the formula:

$$HS-C_mH_{2m}-S-$$

(in which "m" is an integer of 2 to 4) in presulfurization of a desulfurization catalyst to be used in a hydrodesulfurization unit of petroleum refinery of high molecular hydrocarbons, in which fresh metal oxide in said desulfurization catalyst is sulfurized with the hydrogen sulfide produced from sulfur-containing compounds in a feed stream.

6. Method for presulfurization of a promoter according to claim 5, wherein said compound having at least one mercapto alkylthio group is represented by the formula:

$$(R_1, R_2, R_3, R_4, R_5, R_6)\text{—}(S\text{—}C_mH_{2m}\text{—}SH)_n$$

in which each of $R_1$, $R_2$, $R_3$, $R_4$, $R_5$, and $R_6$ is an organic group and is bonded to each other through at least one chemical bond, and at least one of $R_1$, $R_2$, $R_3$, $R_4$, $R_5$, and $R_6$ must exist in the compound, the total carbon number of $R_1$, $R_2$, $R_3$, $R_4$, $R_5$, and $R_6$ being 2 to 28, "m" is an integer of 2 to 4, and "n" is an integer of 1 to 6.

* * * * *